(12) United States Patent
Lu et al.

(10) Patent No.: US 12,147,554 B2
(45) Date of Patent: Nov. 19, 2024

(54) CONTEXTUALIZATION OF ORGANIZATION DATA AND HANDLING STORAGE QUANTIFICATION

(71) Applicant: INTERNATIONAL BUSINESS MACHINES CORPORATION, Armonk, NY (US)

(72) Inventors: Fang Lu, Billerica, MA (US); Clement Decrop, Arlington, VA (US); Zachary A. Silverstein, Georgetown, TX (US); Jeremy R. Fox, Georgetown, TX (US); Pratyush Kumar, Hajipur (IN)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 17/654,833

(22) Filed: Mar. 15, 2022

(65) Prior Publication Data

US 2023/0297705 A1    Sep. 21, 2023

(51) Int. Cl.
    *G06F 21/62* (2013.01)
(52) U.S. Cl.
    CPC .................. *G06F 21/6218* (2013.01)
(58) Field of Classification Search
    CPC .................................................. G06F 21/6218
    See application file for complete search history.

(56) References Cited

U.S. PATENT DOCUMENTS

| | | | |
|---|---|---|---|
| 7,840,619 B2 | 11/2010 | Horn | |
| 9,046,993 B2 | 6/2015 | Bimson | |
| 9,223,987 B2 | 12/2015 | Yoshihama | |
| 10,198,451 B2 | 2/2019 | Prahlad | |
| 11,321,631 B1* | 5/2022 | Chan | ........................ G06F 16/22 |
| 11,450,419 B1* | 9/2022 | Esman | .................... G16H 20/13 |
| 2005/0209983 A1 | 9/2005 | MacPherson | |
| 2005/0273839 A1 | 12/2005 | Mikkonen | |
| 2016/0292445 A1 | 10/2016 | Lindemann | |
| 2017/0142125 A1 | 5/2017 | Lim | |
| 2017/0192994 A1* | 7/2017 | Hong | .................... G06F 16/164 |
| 2020/0019558 A1* | 1/2020 | Okorafor | ............ G06F 21/6254 |

(Continued)

FOREIGN PATENT DOCUMENTS

DE    112012002600 T5    4/2014

OTHER PUBLICATIONS

Khungar et al., "Context Based Storage: System for Managing Data in Ubiquitous Computing Environment," ResearchGate, Jan. 2004, https://www.researchgate.net/publication/234805290_A_context_based_storage_for_ubiquitous_computing_applications, 9 pages.

(Continued)

*Primary Examiner* — Techane Gergiso
(74) *Attorney, Agent, or Firm* — Daniel J Blabolil

(57) ABSTRACT

The present invention may include a computing device that receives root data, where the root data comprises a plurality of datasets. The computing device determines a context of each dataset within the plurality of datasets. The computing device identifies one or more users based on monitoring behavior of the one or more users related to each dataset. The computing device appends metadata associated with each dataset within the plurality of datasets with the determined context and the one or more identified users and setts access restrictions to each dataset in the metadata based on the context and the one or more identified users.

20 Claims, 5 Drawing Sheets

(56) References Cited

U.S. PATENT DOCUMENTS

| | | | | |
|---|---|---|---|---|
| 2020/0394455 | A1* | 12/2020 | Lee | G06N 20/00 |
| 2021/0141920 | A1* | 5/2021 | Khurana | G06F 21/31 |
| 2021/0357470 | A1* | 11/2021 | James | G06F 16/2425 |
| 2022/0035686 | A1* | 2/2022 | Cristofi | H04L 63/1408 |
| 2022/0092209 | A1* | 3/2022 | Litoiu | G06F 21/6227 |
| 2023/0013479 | A1* | 1/2023 | Sankaranarayanan | G06N 20/00 |
| 2023/0252310 | A1* | 8/2023 | O'Donncha | G06N 5/022 706/12 |

OTHER PUBLICATIONS

Mell et al., "The NIST Definition of Cloud Computing", National Institute of Standards and Technology, Special Publication 800-145, Sep. 2011, 7 pages.

* cited by examiner

CONTEXTUALIZATION OF ORGANIZATION DATA AND HANDLING STORAGE QUANTIFICATION

BACKGROUND

The present invention relates, generally, to the field of computing, and more particularly to contextualization and quantification of big data.

Big data typically applies to datasets whose size or type is beyond the ability of traditional relational databases to capture, manage and process with low latency. Analysis of big data allows analysts, researchers and business users to make better and faster decisions using data that was previously inaccessible or unusable. Businesses can use advanced analytics techniques, such as text analytics, machine learning, predictive analytics, data mining, statistics and natural language processing, to gain new insights from previously untapped data sources independently or together with existing enterprise data.

Contextual information is typically any information about any data entity that is used to reduce or improve the amount of logical reasoning such as filtering, aggregation, and inference for computerized decision making within the scope of a specific application. Contextualization is a process of identifying the data relevant to an entity based on the contextual information of the data entity. Contextualization may exclude irrelevant data from consideration and has the potential to reduce data from several aspects including volume, velocity, and variety in large-scale data intensive applications, such as when analyzing or organizing big data.

Data quantification is the task of using supervised learning in order to train models (quantifiers) that estimate the relative frequencies (prevalence values) of the classes of interest in a sample of unlabeled data items. Data quantification may also relate to the task of training predictors that estimate a probability distribution, that generates a predicted distribution to approximate the unknown true distribution of the items across classes of interest. Quantification is different from classification, since the goal of classification is to predict the class labels of individual data items, while the goal of quantification it to predict the class prevalence values of datasets. Quantification is also different from regression, since in regression the training dataset items have real-valued labels, while in quantification the training data items have class labels.

SUMMARY

According to one embodiment, a method, computer system, and computer program product for contextualization for storage quantification is provided. The present invention may include a computing device that receives root data, where the root data comprises a plurality of datasets. The computing device determines a context of each dataset within the plurality of datasets. The computing device identifies one or more users based on monitoring behavior of the one or more users related to each dataset. The computing device appends metadata associated with each dataset within the plurality of datasets with the determined context and the one or more identified users and setts access restrictions to each dataset in the metadata based on the context and the one or more identified users.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
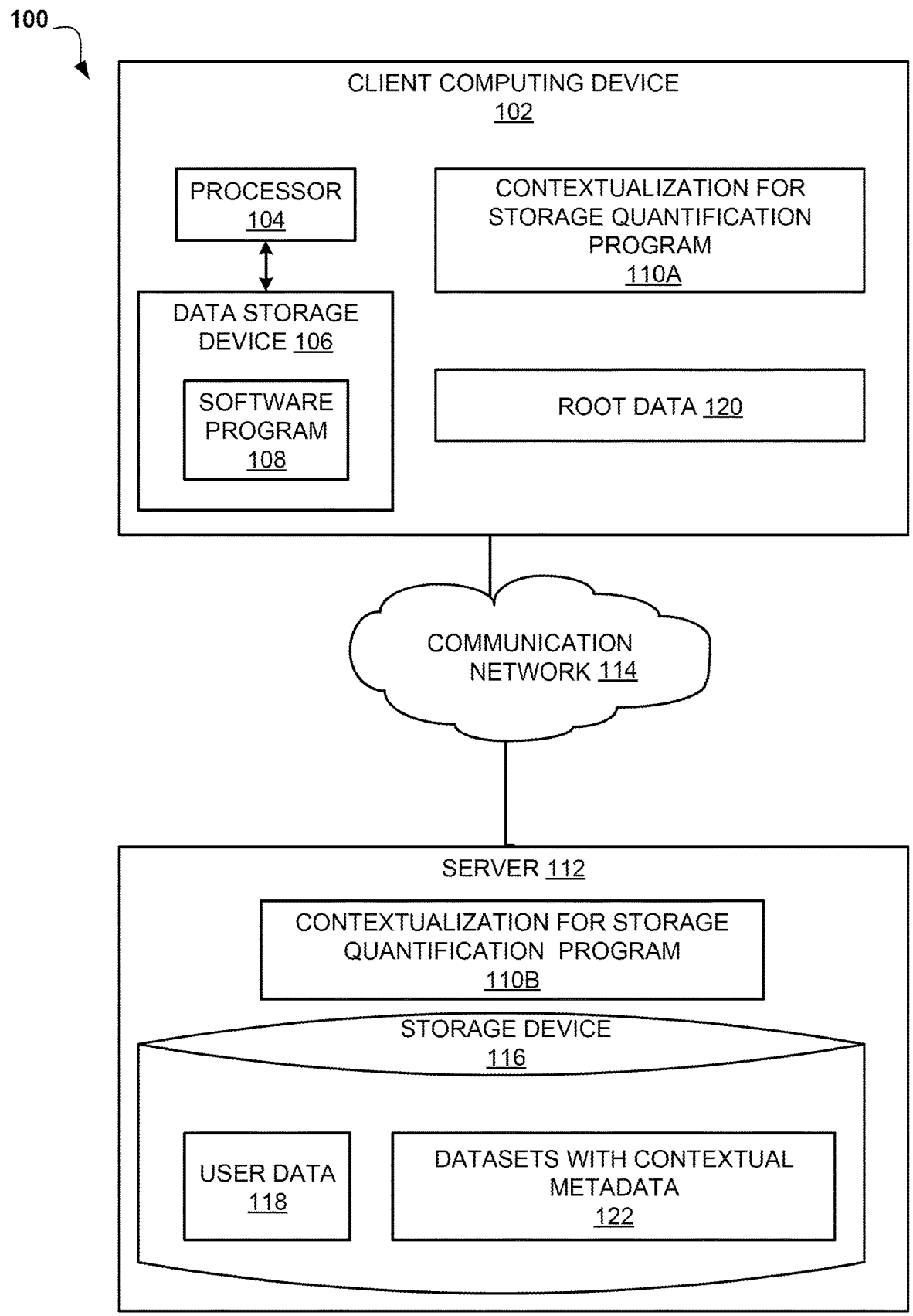
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to contextualization and quantification of big data. The following described exemplary embodiments provide a system, method, and program product to, among other things, efficiently analyze, categorize, and secure the data in a meaningful way through the contextualization and quantification of the data elements, as depicted below. Therefore, the present embodiment has the capacity to improve the technical field of contextualization and quantification of big data by enabling extraction of new metadata from the behavior of users and, thus, allowing automatic securing of data based on the new metadata.

As previously described, contextual information is typically any information about any data entity that is used to reduce or improve the amount of logical reasoning such as filtering, aggregation, and inference for computerized decision making within the scope of a specific application. Contextualization is a process of identifying the data relevant to an entity based on the contextual information of the data entity. Contextualization may exclude irrelevant data from consideration and has the potential to reduce data from several aspects including volume, velocity, and variety in large-scale data intensive applications, such as when analyzing datasets of big data.

Frequently, during data-driven development, big data analysis operations, or during data security identification, managing the amount of data that is collected may be challenging. Large amounts of data typically come from various data sources and shared by different departments within an organization. This makes it challenging to analyze the data that was gathered across multiple and disjointed sources. This is challenging mainly due to diversified datasets that are frequently stored in different systems and in different digital formats. Thus, there is a critical need for a data tool that collects and organizes information in a more efficient way. As such, it may be advantageous to, among other things, implement a system that reduces the time for processing data and enables access to all types of information in one location.

According to one embodiment, data may be analyzed, categorized, and secured through contextualization and quantification by classifying data based on a historical corpus, arranging and securing the data based on sharing of the data between different users and performing a reverse metadata linkage by capturing the ways that users utilize while modifying or accessing each file or document that is related to the dataset of the ingested data. For example, if the data is a report or any document in a natural language, users that manipulated the report, such as users that opened or amended the document, may be identified and, after identifying that a context of the report may be related to a document, access to the document may be limited only to users related to documents within the organizations. Furthermore, the users that opened the document and typically shared similar documents having same context in the past may be permitted or notified, thus dynamic adjustment of security privileges for the document may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to determine data residency requirements based on the contextualization and quantification of the data and the handling of the data by the users.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108, a contextualization for storage quantification program 110A, store root data 120 and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively. The root data 120 may be any big data that the user opts-in to be analyzed and controlled by the contextualization for storage quantification program 110A.

The server computer 112 may be a laptop computer, netbook computer, personal computer (PC), a desktop computer, or any programmable electronic device or any network of programmable electronic devices capable of hosting and running a contextualization for storage quantification program 110B and a storage device 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

The storage device 116 may store user data 118 and datasets with contextual metadata 122. According to an example embodiment, the user data 118 may incorporate links to various data items and documents that include organization name, role of the user, security preferences for the user and content that the user is allowed to access. The datasets with contextual metadata 122 may be a database or other searchable digital content that may incorporate one or more datasets from the root data 120 and an extensive metadata for each dataset that includes one or more contexts associated with the dataset, link to one or more users in the user data 118 that have access to the content and to the dataset, and links to derivative or related datasets by content in the root data 120.

According to the present embodiment, the contextualization for storage quantification program 110A, 110B may be a program capable of analyzing user historical data and user behavior data while accessing root data in order to quantify the datasets of the root data and generate a contextual metadata to enable efficient analysis, categorization, and secure storage of the data in a meaningful way through the contextualization of the data elements. The contextualization for storage quantification method is explained in further detail below with respect to FIG. 2.

Figure 2:
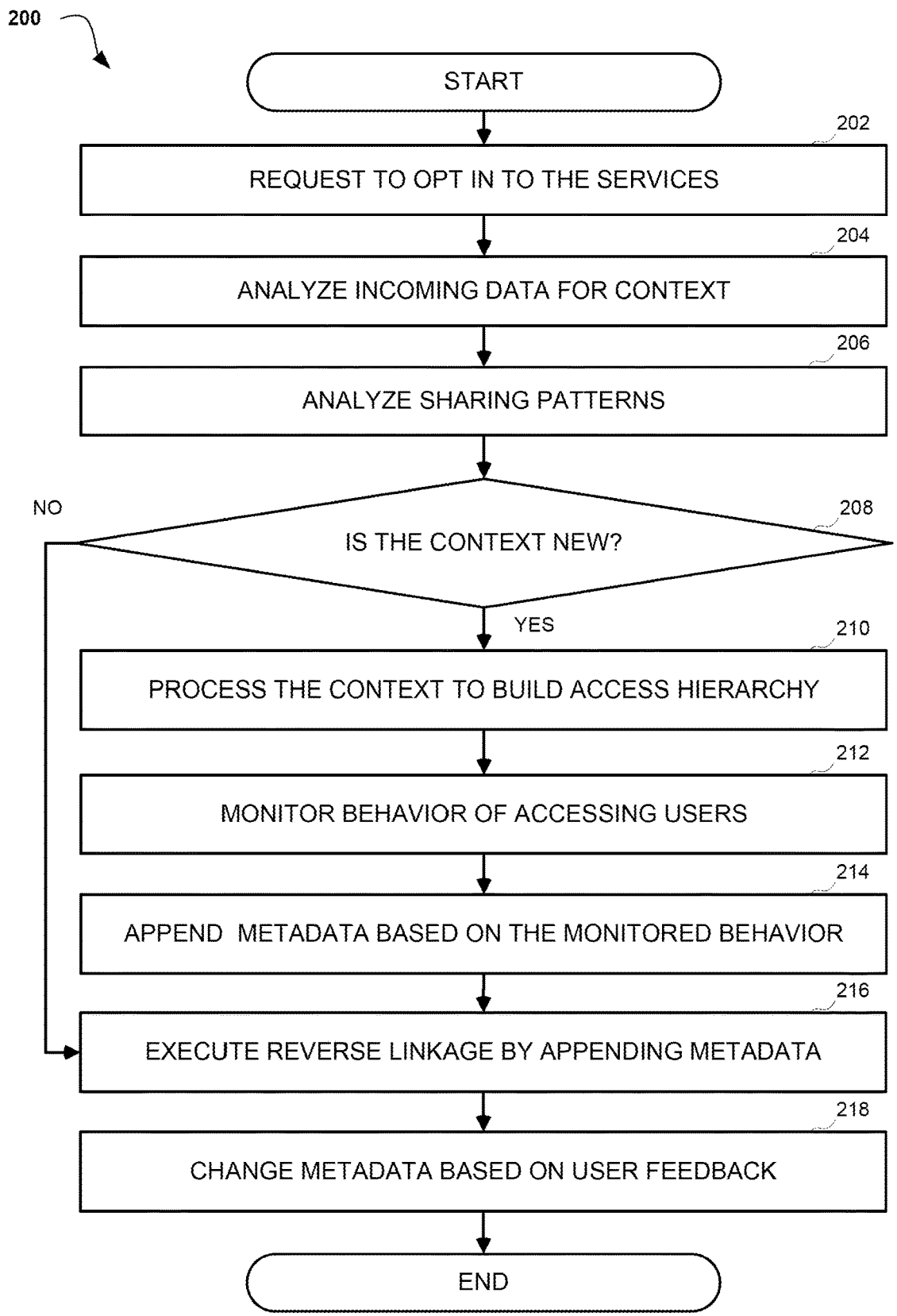
FIG. 2 is an operational flowchart illustrating a contextualization for storage quantification process according to at least one embodiment.

Referring now to FIG. 2, an operational flowchart illustrating a contextualization for storage quantification process 200 is depicted according to at least one embodiment. At 202, the contextualization for storage quantification program 110A, 110B requests a user to opt-in to the services. According to an example embodiment, the contextualization for storage quantification program 110A, 110B may request a user to opt-in for the services using a Graphical User Interface (GUI) of the client computing device 102 that enables the user to opt-in for the services. In another embodiments, the contextualization for storage quantification program 110A, 110B may enable the user to choose the root data 120 that the user would like to process by contextualization for storage quantification program 110A, 110B. When the user opts-in for the services, the contextualization for storage quantification program 110A, 110B may integrate with a cloud storage platform such as server 112. Furthermore, the contextualization for storage quantification program 110A, 110B enables the user to opt out from the services using GUI.

Next, at 204, the contextualization for storage quantification program 110A, 110B analyzes the incoming data for context. According to an example embodiment, the contextualization for storage quantification program 110A, 110B may index the root data, such as root data 120, divide it into a plurality of datasets and upload the indexed data to the platform such as storage device 116, prior to analysis. According to an example embodiment, the contextualization for storage quantification program 110A, 110B analyzes the datasets using a natural language processing (NLP) in order to identify the context of each dataset from the root data 120. For example, the NLP that identifies the context may be based on Bag of Words (BoW), Word2Vec and BERT models. When the plurality of datasets from root data 120 incorporate audio, video or multimedia content, the contextualization for storage quantification program 110A, 110B may utilize Speech-To-Text techniques, such as a trained many to many recurrent neural network model, that may convert the audio to text and then process the text using the NLP for context identification. When the audio cannot be converted to text, such as in the case of music or other natural sounds, the contextualization for storage quantification program 110A, 110B may utilize a Fourier Transform approach to convert the audio into a specific function (an equation) that may then be analyzed or compared to stored specific functions on server 112, and used as a context.

Then, at 206, the contextualization for storage quantification program 110A, 110B analyzes sharing patterns. According to an example embodiment, the contextualization for storage quantification program 110A, 110B may monitor data sharing patterns between different stakeholders and the user. According to an example embodiment, the contextualization for storage quantification program 110A, 110B may generate user profiles in the user data 118, group the stakeholders based on the context, shared material, organizations that the stakeholders are associated with, role of the stakeholders at each organization and other various group relations and thus store and update the relations between the users in user data 118 and datasets with contextual metadata 122. For example, the contextualization for storage quantification program 110A, 110B may analyze the user and the stakeholders through corresponding job title descriptions, email address, geolocation and other related data. In addition, the contextualization for storage quantification program 110A, 110B may analyze current user interactions with other stakeholders based on existing entries in user data 118 and historical actions of the user that are stored on client computing device 102 in log files or social or collaborative networks of the user. In another embodiments, the contextualization for storage quantification program 110A, 110B may identify whether datasets from the root data 120 were shared on different social or file sharing platforms, and thus identify the other users that manipulated with the shared dataset such as amended or viewed the shared dataset and thus, update the stakeholders that reviewed the datasets with the user. In further embodiments, the contextualization for storage quantification program 110A, 110B may capture naming conventions, reference terms when the data is communicated across different users and assign these users a specific flag or index in user data 118.

Then, at 208, the contextualization for storage quantification program 110A, 110B may determine whether the context is new. According to an example embodiment, the contextualization for storage quantification program 110A, 110B stores all of the identified context data identified in step 204 in datasets with contextual metadata 122, thus newly identified context keywords or flags may be compared to the existing entries in datasets with contextual metadata 122 and when a newly identified context is not in the contextual metadata it is new. If the contextualization for storage quantification program 110A, 110B determines that the context is new (step 208, "YES" branch), the contextualization for storage quantification program 110A, 110B may continue to step 210 to process the content to build access hierarchy. If the contextualization for storage quantification program 110A, 110B determines that the context is not new (step 208, "NO" branch), the contextualization for storage quantification program 110A, 110B may continue to step 216 to execute reverse linkage by appending metadata.

Next, at 210, the contextualization for storage quantification program 110A, 110B may process the new content to build access hierarchy. According to an example embodiment, the contextualization for storage quantification program 110A, 110B may assign a new flag or a new index key to the newly identified context and, based on the flag and the index, update the access to the users that previously viewed or shared the content and generate an initial access hierarchy of the dataset in datasets with contextual metadata 122. Furthermore, the contextualization for storage quantification program 110A, 110B may identify access parameters of the user in user data 118 and assign security settings to the dataset based on the parameters associated with the user. For example, if one of the users that shared the dataset is associated with a position that has access to confidential information, the contextualization for storage quantification program 110A, 110B may store the dataset that is associated with the content in a special database with a unique naming convention and allow access to the dataset only to the users that share an associated flag or the associated index key of the confidential information.

Then, at 212, the contextualization for storage quantification program 110A, 110B monitors behavior of accessing users. According to an example embodiment, the contextualization for storage quantification program 110A, 110B may identify one or more users that manipulated data related to the context or the dataset such as reviewed or amended the dataset in another application by monitoring and reviewing user activities utilizing application programming interfaces (APIs) of the contextualization for storage quantification program 110A, 110B. For example, the contextualization for storage quantification program 110A, 110B may monitor internet platforms and file sharing services to identify other users that amended or used the dataset. In another embodiment, the contextualization for storage quantification program 110A, 110B may run a loop to step 208 in case the dataset was amended in order to identify whether a new context was introduced by the user.

Next, at 214, the contextualization for storage quantification program 110A, 110B appends metadata based on the monitored behavior. According to an example embodiment, the contextualization for storage quantification program 110A, 110B may append the metadata related to the context with the sharing behavior of the newly created dataset and update a content specific access level. Furthermore, the contextualization for storage quantification program 110A, 110B may utilize key terms when storing the metadata of the dataset in the datasets with contextual metadata 122. According to an example embodiment, the contextualization for storage quantification program 110A, 110B may utilize nesting approach to automatically set access restrictions to one or more datasets associated with the new context. This method may be based on the existing data sharing behavior analysis such as by utilizing various clustering algorithms that are used to group the datasets by a context, such as by grouping using K-means algorithm. Furthermore, the contextualization for storage quantification program 110A, 110B may predict new alignments based on the existing hierarchy and context of the dataset inserted in those hierarchies, by utilizing the dataset to train a neural network that generates a hierarchy between the datasets to further classify the incoming dataset stream. The contextualization for storage quantification program 110A, 110B may then use a K-Nearest neighbor algorithm to leverage clustering of new datasets to existing clusters in the datasets with contextual metadata 122.

Then, at 216, the contextualization for storage quantification program 110A, 110B executes reverse linkage by appending metadata. According to an example embodiment, the contextualization for storage quantification program 110A, 110B may integrate at a browser, an application, or operating system by utilizing APIs or other techniques and track and determine when content is accessed or amended by the user, such as when working on the client computing device 102, or when the document that incorporates the dataset with the context is accessed by the user. According to one of the embodiments, the contextualization for storage quantification program 110A, 110B may recognize the dataset by a unique key or similarity to the dataset by monitoring copy and paste behavior of the user. When the similar dataset is identified the dependency in the datasets with contextual metadata 122 may be updated to link the existing dataset to a dataset on the client computing device 102. Furthermore, the contextualization for storage quantification program 110A, 110B may update an access to the similar dataset based on the parent dataset access restrictions.

Then, at 218, the contextualization for storage quantification program 110A, 110B changes metadata based on user feedback. According to an example embodiment, the contextualization for storage quantification program 110A, 110B may present the identified users with access and identified context and enable the user to adjust associated keys, flags and context names, using the GUI.

It may be appreciated that FIG. 2 provides only an illustration of one implementation and does not imply any limitations with regard to how different embodiments may be implemented. Many modifications to the depicted environments may be made based on design and implementation requirements. According to an alternative embodiment, the contextualization for storage quantification program 110A, 110B may utilize Internet of Things (IoT) data sensors that may be quantified with the data storage techniques. In further embodiments, a geolocation of the users may be quantified and used to identify whether the user should gain an access to one or more of the datasets.

Figure 3:
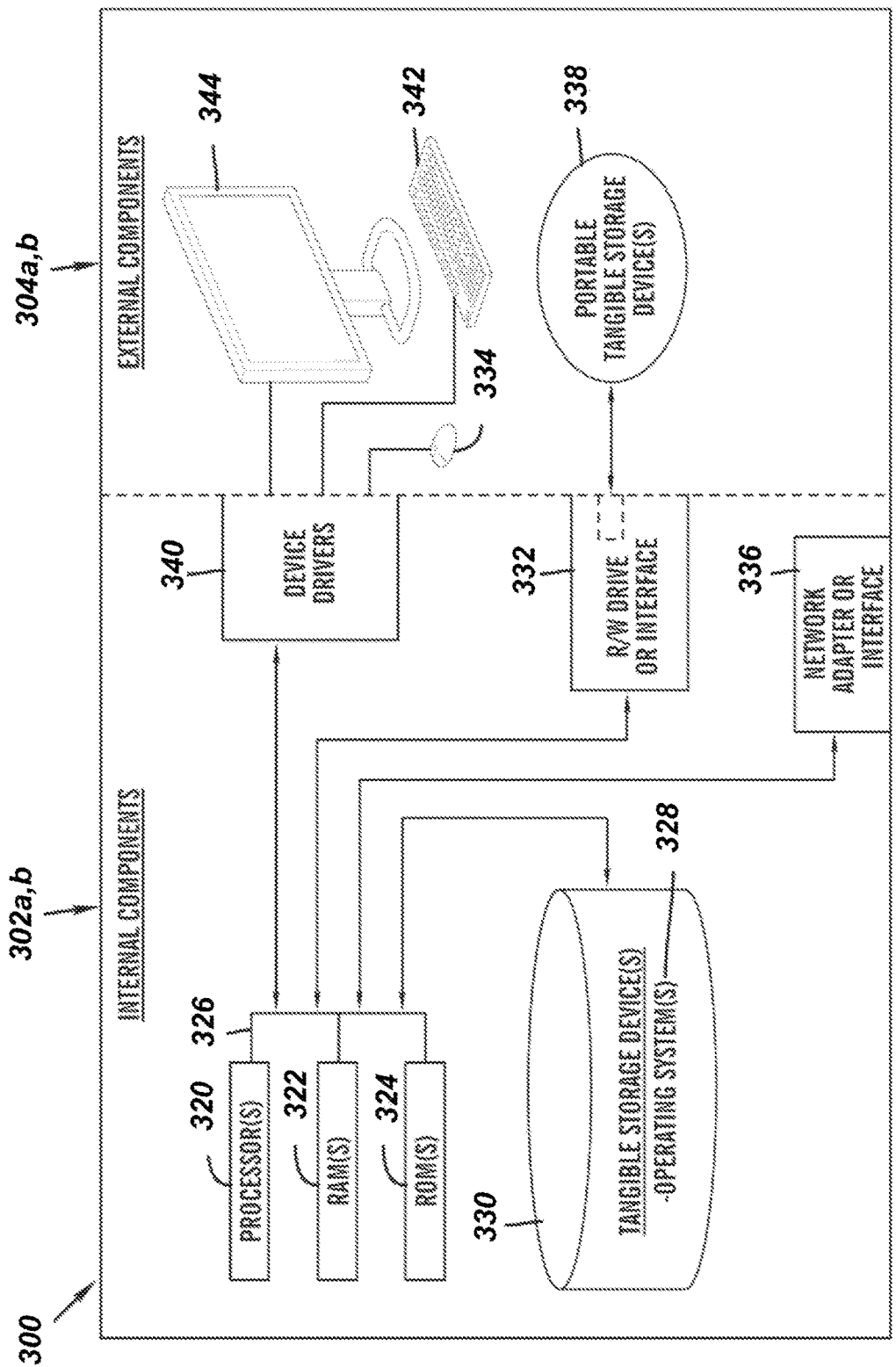
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302a,b and external components 304a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the contextualization for storage quantification program 110A in the client computing device 102, and the contextualization for storage quantification program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the contextualization for storage quantification program 110A, 110B, can be stored on one or more of the respective portable computer-readable tangible storage devices 338, read via the respective R/W drive or interface 332, and loaded into the respective hard drive 330.

Each set of internal components 302a,b also includes network adapters or interfaces 336 such as a TCP/IP adapter cards, wireless Wi-Fi interface cards, or 3G or 4G wireless interface cards or other wired or wireless communication links. The software program 108 and the contextualization for storage quantification program 110A in the client computing device 102 and the contextualization for storage quantification program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the contextualization for storage quantification program 110A in the client computing device 102 and the contextualization for storage quantification program 110B in the server 112 are loaded into the respective hard drive 330. The network may comprise copper wires, optical fibers, wireless transmission, routers, firewalls, switches, gateway computers and/or edge servers.

Each of the sets of external components 304a,b can include a computer display monitor 344, a keyboard 342, and a computer mouse 334. External components 304a,b can also include touch screens, virtual keyboards, touch pads, pointing devices, and other human interface devices. Each of the sets of internal components 302a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
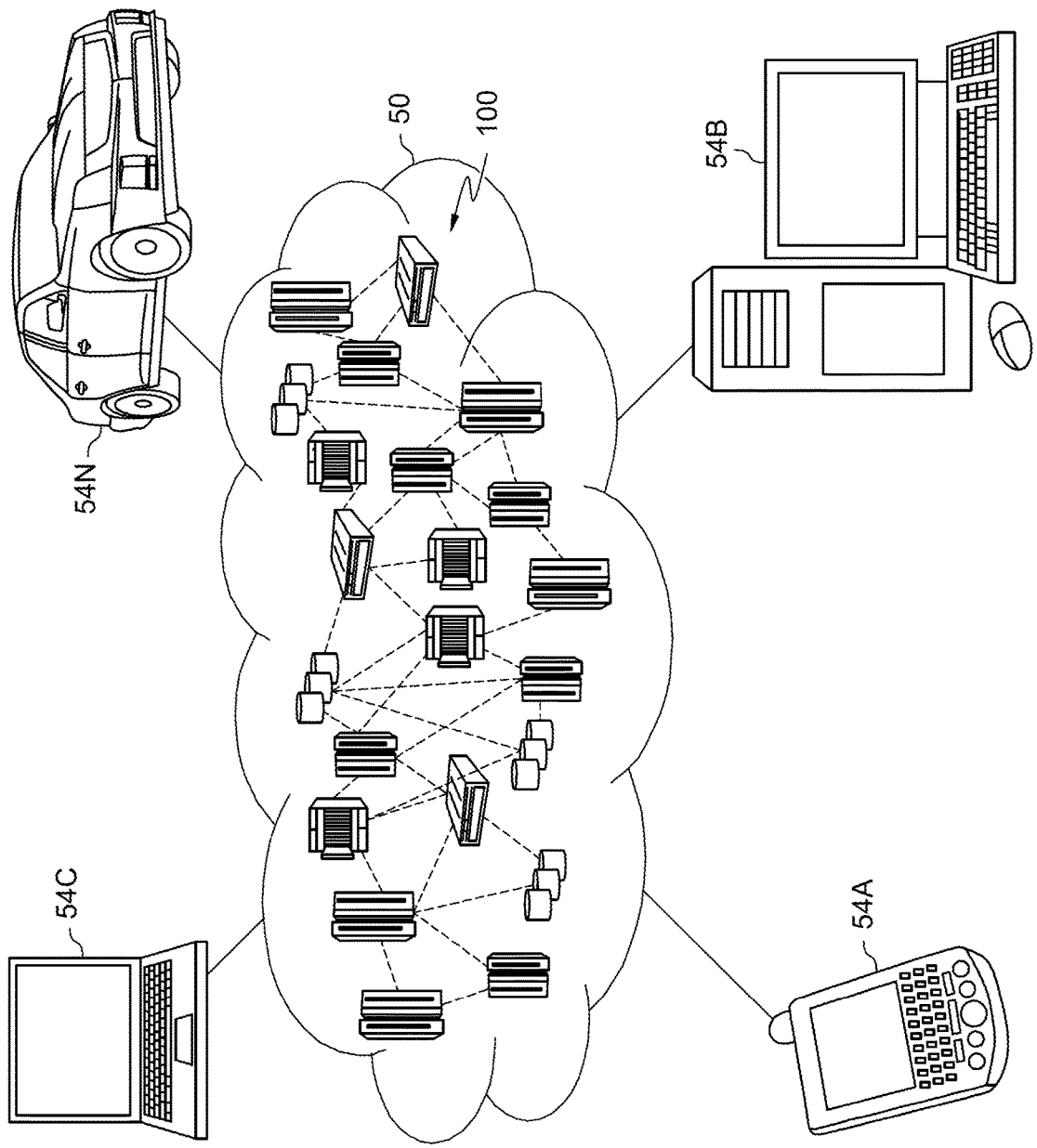
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
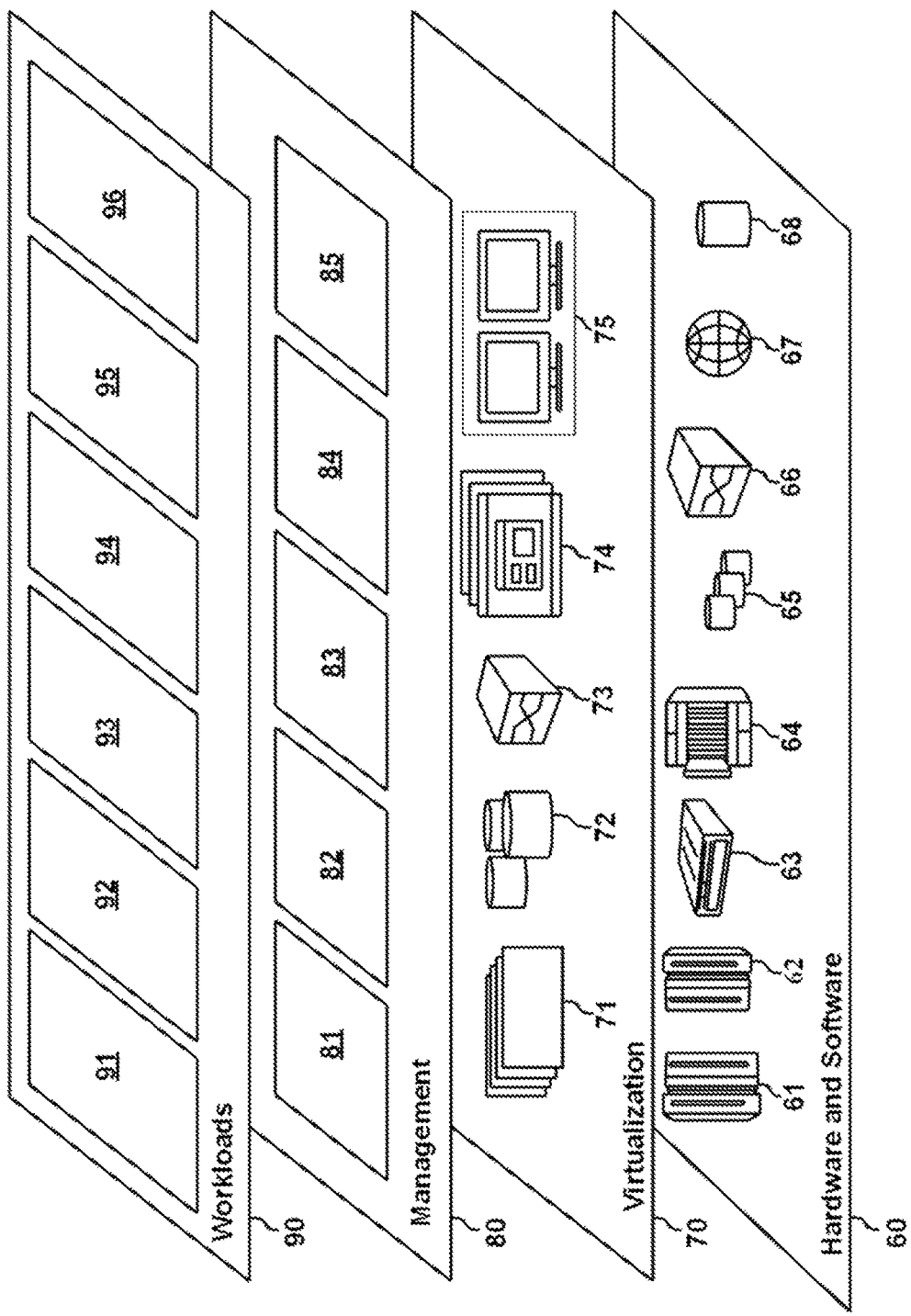
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and contextualization for storage quantification 96. Contextualization for storage quantification 96 may relate to analyzing user behavior as to sharing various datasets based on content and sharing parameters in order to restrict an access to the datasets.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for contextualization for storage quantification, the method comprising:
receiving root data, wherein the root data comprises a plurality of datasets;
analyzing the root data to determine a context of each dataset within the plurality of datasets;
analyzing sharing patterns for interactions between entities, wherein the sharing patterns comprise data sharing patterns between one or more stakeholders and a user;
determining whether the context of each dataset within the plurality of datasets is new;
processing a new context of each dataset within the plurality of datasets to build access hierarchy upon determining that the context of at least one of the datasets within the plurality of datasets is new;
identifying one or more accessing users based on monitoring behavior of the one or more accessing users related to each of the datasets within the plurality of datasets;
appending metadata associated with the new context of each of the datasets within the plurality of datasets based on the determined context and the analyzed sharing patterns of the one or more identified accessing users; and
setting access restrictions to each dataset in the metadata based on the context and the one or more identified accessing users.

2. The method of claim 1, further comprising:
executing reverse linkage upon determining that the context of at least one of the datasets within the plurality of datasets is old by:
capturing a use of the one or more datasets; and
appending the metadata of the one or more datasets with a link to the use.

3. The method of claim 1, wherein the plurality of datasets selected from a group consisting of a text, a video, and a voice.

4. The method of claim 1, wherein determining the context further comprises:
converting each dataset to text; and
determine the context by natural language processing.

5. The method of claim 4, further comprising:
clustering each dataset using a K means algorithm.

6. The method of claim 1, wherein monitoring behavior of the one or more users is performed by application programming interfaces that identify manipulations with the one or more datasets by the one or more users.

7. The method of claim 6, further comprising:
appending the metadata of the one or more datasets with a link to the manipulations with the one or more datasets.

8. A computer system for contextualization for storage quantification, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving root data, wherein the root data comprises a plurality of datasets;
analyzing the root data to determine a context of each dataset within the plurality of datasets;
analyzing sharing patterns for interactions between entities, wherein the sharing patterns comprise data sharing patterns between one or more stakeholders and a user;
determining whether the context of each dataset within the plurality of datasets is new;
processing a new context of each dataset within the plurality of datasets to build access hierarchy upon determining that the context of at least one of the datasets within the plurality of datasets is new;
identifying one or more accessing users based on monitoring behavior of the one or more accessing users related to each of the datasets within the plurality of datasets;
appending metadata associated with the new context of each of the datasets within the plurality of datasets based on the determined context and the analyzed sharing patterns of the one or more identified accessing users; and
setting access restrictions to each dataset in the metadata based on the context and the one or more identified accessing users.

9. The computer system of claim 8, further comprising:
executing reverse linkage upon determining that the context of at least one of the datasets within the plurality of datasets is old by:
capturing a use of the one or more datasets; and
appending the metadata of the one or more datasets with a link to the use.

10. The computer system of claim 8, wherein the plurality of datasets selected from a group consisting of a text, a video, and a voice.

11. The computer system of claim 8, wherein determining the context further comprises:
converting each dataset to text and analyzing the text; and
determining the context by natural language processing.

12. The computer system of claim 11, further comprising:
clustering each dataset using a K means algorithm.

13. The computer system of claim 8, wherein monitoring behavior of the one or more users is performed by application programming interfaces that identify manipulations with the one or more datasets by the one or more users.

14. The computer system of claim 13, further comprising:
appending the metadata of the one or more datasets with a link to the manipulations with the one or more datasets.

15. A computer program product for contextualization for storage quantification, the computer program product comprising:
one or more computer-readable tangible storage medium and program instructions stored on at least one of the one or more tangible storage medium, the program instructions executable by a processor, the program instructions comprising:
program instructions to analyze the root data to determine a context of each dataset within the plurality of datasets;
program instructions to analyze sharing patterns for interactions between entities, wherein the sharing patterns comprise data sharing patterns between one or more stakeholders and a user;
program instructions to determine whether the context of each dataset within the plurality of datasets is new;
program instructions to process a new context of each dataset within the plurality of datasets to build access hierarchy upon determining that the context of at least one of the datasets within the plurality of datasets is new;
program instructions to identify one or more accessing users based on monitoring behavior of the one or more accessing users related to each of the datasets within the plurality of datasets;
program instructions to append metadata associated with the new context of each of the datasets within the plurality of datasets based on the determined context and the analyzed sharing patterns of the one or more identified accessing users; and
program instructions to set access restrictions to each dataset in the metadata based on the context and the one or more identified accessing users.

16. The computer program product of claim 15, further comprising:
program instructions to execute reverse linkage upon determining that the context of at least one of the datasets within the plurality of datasets is old by:
program instructions to capture a use of the one or more datasets; and
program instructions to append the metadata of the one or more datasets with a link to the use.

17. The computer program product of claim 15, wherein the plurality of datasets selected from a group consisting of a text, a video, and a voice.

18. The computer program product of claim 15, wherein program instructions to determine the context further comprises:
program instructions to convert each dataset to text; and
program instructions to determine the context by natural language processing.

19. The computer program product of claim 18, further comprising:
program instructions to cluster each dataset using a K means algorithm.

20. The computer program product of claim 15, wherein program instructions to monitor behavior of the one or more users is performed by application programming interfaces that identify manipulations with the one or more datasets by the one or more users.

* * * * *